(12) United States Patent
Dong et al.

(10) Patent No.: US 12,705,571 B2
(45) Date of Patent: Aug. 11, 2026

(54) MATERIAL CONVEYING METHOD, DEVICE, SYSTEM AND STORAGE MEDIUM

(71) Applicant: BEIJING JINGDONG ZHENSHI INFORMATION TECHNOLOGY CO., LTD., Beijing (CN)

(72) Inventors: Hongyu Dong, Beijing (CN); Wenbo Hu, Beijing (CN); Yingguang Zhao, Beijing (CN); Li Zhou, Beijing (CN)

(73) Assignee: BEIJING JINGDONG ZHENSHI INFORMATION TECHNOLOGY CO., LTD., Beijing (CN)

( * ) Notice: Subject to any disclaimer, the term of this patent is extended or adjusted under 35 U.S.C. 154(b) by 180 days.

(21) Appl. No.: 18/044,557

(22) PCT Filed: Dec. 6, 2021

(86) PCT No.: PCT/CN2021/135852

§ 371 (c)(1),
(2) Date: Mar. 8, 2023

(87) PCT Pub. No.: WO2022/156392

PCT Pub. Date: Jul. 28, 2022

(65) Prior Publication Data

US 2023/0351321 A1 Nov. 2, 2023

(30) Foreign Application Priority Data

Jan. 21, 2021 (CN) ......................... 202110083056.8

(51) Int. Cl.
*G06Q 10/087* (2023.01)
*G06Q 10/047* (2023.01)
*G06Q 10/0834* (2023.01)

(52) U.S. Cl.
CPC ......... *G06Q 10/087* (2013.01); *G06Q 10/047* (2013.01); *G06Q 10/08345* (2013.01)

(58) Field of Classification Search
CPC ............... G06Q 10/087; G06Q 10/047; G06Q 10/08345

(Continued)

(56) References Cited

U.S. PATENT DOCUMENTS 9,786,187 B1 10/2017 Bar-Zeev et al.
10,007,889 B2 * 6/2018 Arunapuram ........ G06Q 10/047

(Continued)

FOREIGN PATENT DOCUMENTS

CN 102165481 A * 8/2011 ............. G06Q 10/08
CN 103679316 A * 3/2014

(Continued)

OTHER PUBLICATIONS

Notification of Grant of Patent Rights for Invention Application dated Oct. 27, 2023 regarding Chinese Application No. 202110083056.8.

(Continued)

*Primary Examiner* — Luna Champagne

(57) ABSTRACT

A material conveying method, device and system and a storage medium. The method specifically includes: first determining a target conveying route from a plurality of candidate conveying routes according to a route planning model; then generating a conveying instruction according to the target conveying route and user order information; and finally sending the conveying instruction to a conveying device to enable the conveying device to convey a material from a source node of supply to a user node via the target conveying route, where the candidate conveying routes refer to routes from a source node of supply to a user node via at least one candidate warehouse. The present method can realize warehouse route planning and material transportation control.

20 Claims, 3 Drawing Sheets

(58) Field of Classification Search
USPC ........................................................ 705/28
See application file for complete search history.

(56) References Cited

U.S. PATENT DOCUMENTS

| | | | | |
|---|---|---|---|---|
| 2007/0088530 | A1* | 4/2007 | Erignac | G06F 30/15 703/1 |
| 2014/0180958 | A1 | 6/2014 | Arunapuram et al. | |
| 2018/0349850 | A1 | 12/2018 | Hosoda et al. | |

FOREIGN PATENT DOCUMENTS

| | | | |
|---|---|---|---|
| CN | 106296100 | A | 1/2017 |
| CN | 109816147 | A | 5/2019 |
| CN | 110288167 | A | 9/2019 |
| CN | 110390501 | A | 10/2019 |
| CN | 111553626 | A | 8/2020 |
| CN | 111950950 | A | 11/2020 |
| JP | 2000172745 | A | 6/2000 |
| JP | 2002356232 | A | 12/2002 |
| JP | 2005075634 | A | 3/2005 |
| JP | 2007279954 | A | 10/2007 |
| JP | 2010150020 | A | 7/2010 |
| JP | 2010269867 | A | 12/2010 |
| JP | 2018205806 | A | 12/2018 |
| JP | 2020067677 | A | 4/2020 |
| KR | 20050071798 | A | 7/2005 |
| WO | WO2020074567 | A1 | 4/2020 |

OTHER PUBLICATIONS

Li-feng Wang et al. “Logistics Transportation Rapid Delivery Path Planning Simulation,” Aug. 15, 2017, vol. 34, No. 8, pp. 348-351.
Xiao-ming WU et al., “Inventory-distribution joint optimization in fresh agricultural products distribution” Mar. 16, 2016, vol. 37, No. 3, pp. 267-272.
The Extended Search Report dated Apr. 19, 2024 for Application No. 21920766.9.
Notice of Reasons for Refusal dated Jan. 31, 2024 for Japanese Patent Application No. 2022-579961.
International Search Report dated Mar. 9, 2022 for International Application No. PCT/CN2021/135852.

* cited by examiner

MATERIAL CONVEYING METHOD, DEVICE, SYSTEM AND STORAGE MEDIUM

CROSS-REFERENCE TO RELATED APPLICATIONS

This application is a national stage of International Application No. PCT/CN2021/135852, filed on Dec. 6, 2021, which claims priority to Chinese Patent Application No. 202110083056.8, filed on Jan. 21, 2021. Both of the aforementioned applications are hereby incorporated by reference in their entireties.

TECHNICAL FIELD

The present application relates to the field of logistics technology, in particular to a material conveying method, a device, a system and a storage medium.

BACKGROUND

When an existing e-commerce supplier's goods are delivered to a customer, a following process is required: after being purchased from the supplier, the goods are stored in a central warehouse, then the goods are replenished from the central warehouse to a regional warehouse, then the goods are transferred from the regional warehouse to a front distribution center, then the goods are transferred from the front distribution center to a store, and after the customer places an order, a store closest to the customer is selected, and then the goods are sent from the store.

In a new retailing mode, in order to respond to the customer's demand faster and shorten the supply chain, the store is directly set in a front distribution center mode by canceling the central warehouse to achieve rapid response. A supply chain in the new retailing mode is: source node of supply→regional distribution center→store→user node. After a customer places an order, a nearest store may be selected to provide a material to the user node, or a nearest regional distribution center may be selected to directly provide the material to the user node. This combination of the regional distribution center and the store constitutes a new retailing supply system.

For a supply system where the regional distribution center directly provides the material to the user node and the store provides the material to the user node, it is urgent to provide a solution to optimize a material transmission route in the supply system.

SUMMARY

According to a first aspect of the embodiments of the present application, a material conveying method applied to a server includes:

determining a target conveying route from a plurality of candidate conveying routes according to a route planning model; where the candidate conveying routes refer to routes from a source node of supply to a user node via at least one candidate warehouse;

generating a conveying instruction according to the target conveying route and user order information; and sending the conveying instruction to a conveying device to enable the conveying device to convey a material from the source node of supply to the user node via the target conveying route.

According to a second aspect of the present application, a server includes a memory and a processor;

the memory is configured to store an executable instruction of the processor;

where the processor is configured to implement the material conveying method in the first aspect and optional solutions thereof.

According to a third aspect of the present application, a material conveying system includes a conveying device and the server in the second aspect.

According to a fourth aspect of the present application, a computer readable storage medium stores a computer executable instruction, which is used to implement the material conveying method in the first aspect and optional solutions thereof when being executed by a processor.

According to a fifth aspect of the present application, a computer program product includes a computer program/instruction, which is used to implement the material conveying method in the first aspect and optional solutions thereof when being executed by a processor.

DESCRIPTION OF EMBODIMENTS

In order to make purposes, technical solutions and advantages of the present application clearer, the technical solutions in the present application will be described clearly and completely below in conjunction with drawings in the present application. Obviously, described embodiments are part of the embodiments of the present application, not all of them. Based on the embodiments in the present application, other embodiments obtained by persons of ordinary skills in the art without creative labor belong to protection scope of the present application.

Figure 1:
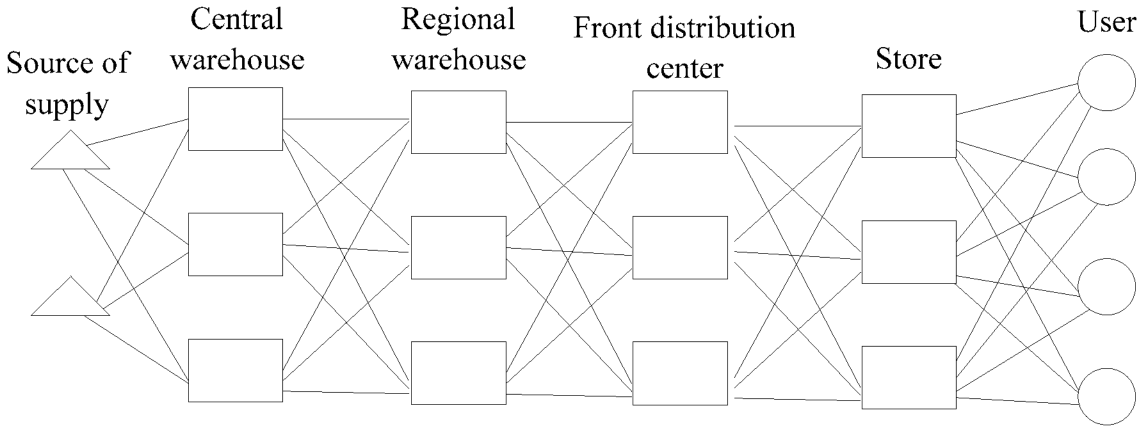
FIG. 1 is a schematic diagram of an applicable scenario of a material conveying method according to one or more embodiments of the present application.

As shown in FIG. 1, in the existing e-commerce sales mode, a conveying network includes a central warehouse, a regional warehouse and a front distribution center. A conveying process includes: purchasing a material from a supplier and sending the material to the central warehouse, then transporting the material from the central warehouse to the regional warehouse, then transferring the material from the regional warehouse to the front distribution center, then transferring from the front distribution center to a store, and after a customer places an order, selecting a store closest to the customer to send the material.

Figure 2:
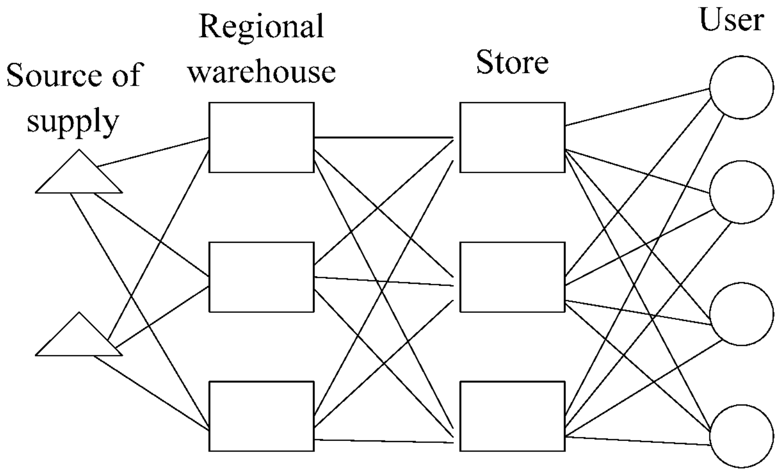
FIG. 2 is a schematic diagram of an applicable scenario of a material conveying method according to one or more embodiments of the present application.

As shown in FIG. 2, in the new retailing mode, in order to respond to the customer's demand faster and shorten the supply chain, the store is directly set as a front distribution center by canceling the central warehouse to achieve rapid response. A conveying network in the new retailing includes a regional warehouse and a store. A conveying process includes: purchasing a material from a supplier and sending the material to the regional warehouse, and then transporting the material from the regional warehouse to the store. After a customer places an order, a cargo may be shipped in a nearest store, and if store inventory cannot be conveyed, the regional warehouse may directly arrange shipment as a supplement. A mode of a regional warehouse and a store constitute a supply system of new retailing.

Planning of the conveying network is significant. After a conveying network layout is determined, a conveying instruction for delivering a material in a user's order may be generated according to the conveying network, and a reasonable conveying network layout can shorten transportation time and save costs.

One of existing technologies is to use a weighted grade method to realize selecting a location of a conveying warehouse. First, a candidate warehouse is selected based on a principle of satisfying three main requirements which are safety requirements, convenience principles and legal restrictions.

For the safety requirements, following conditions should be satisfied: 1) no flammable and explosive buildings; 2) facilities for the three preventions are sound; 3) limitations on natural resources such as the terrain; 4) safety requirements for water supply and drainage, fire protection, lightning protection, etc. For the convenience principles, following conditions should be satisfied: 1) congested areas are avoided, 2) the nearby is convenient, there are arterial roads, and especially free access of trucks for 24 hours. For the legal restrictions, following conditions should be satisfied: 1) legal and valid certificates such as a legal real estate ownership certificate, a land certificate, a business license of an enterprise and a tax registration certificate; 2) it is consistent with land use restrictions in the nation.

Then a plurality of indicators that need to be focused on for the candidate warehouse are listed, for example, rent, traffic, etc., and each indicator is scored. At the same time, a corresponding weight for each indicator is set, weighted scores of the indicators are summed to obtain an evaluation value of each candidate warehouse, and then the candidate warehouse with a largest or the highest evaluation value is set as a conveying warehouse. Since only properties of a warehouse itself are considered while upstream and downstream factors of a supply chain are not considered in this solution, a minimum conveying cost of the warehouse network cannot be guaranteed.

Another existing technology is the barycenter method. Specifically, total transportation cost is set as an objective, and an address with a lowest total transportation cost among upstream and downstream nodes is set as a new warehouse address, where various distance modes may be used. A disadvantage of this solution is that an address is selected among a plurality of warehouses according to the barycenter, and a location of the address may be usually within lakes and rivers.

To solve the problems in the existing art, according to the embodiments of the present application, a warehousing route planning solution is accurately proposed, so as to generate a conveying instruction for transporting a material in a user's order according to warehousing route planning, reduce conveying costs and shorten conveying time. According to the present application, a solution for determining a multi-stage conveying network with a lowest conveying cost and highest conveying efficiency is proposed, so that a conveying instruction for controlling a conveying device to convey a material may be determined according to the multi-stage conveying network and a user's order information. Moreover, this solution can adapt to planning of a conveying network of any stage, and is applicable to a construction of a conveying network in the existing e-commerce sales mode, as well as a construction of a conveying network in the new retailing mode, which is in a wider range.

Figure 3:
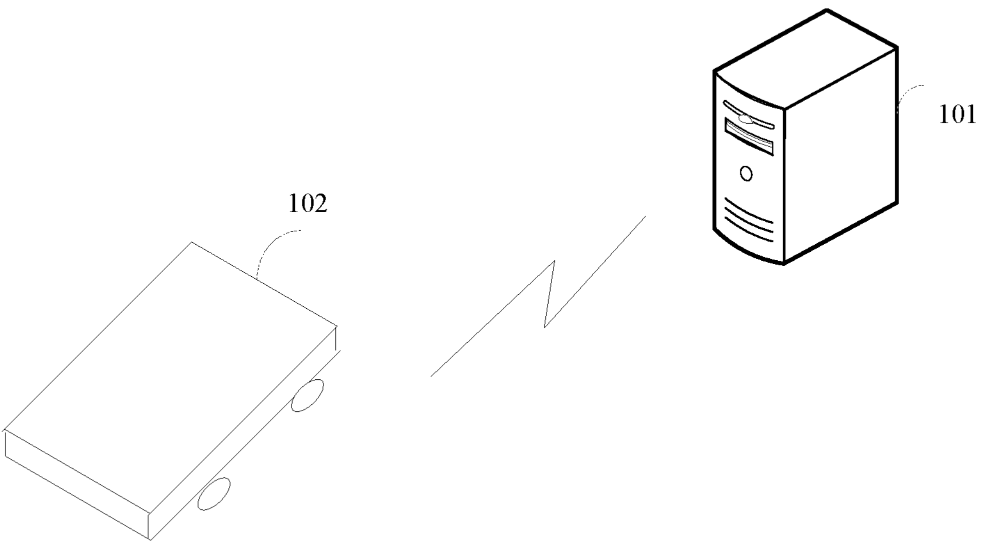
FIG. 3 is a structural diagram of a material conveying system according to one or more embodiments of the present application.

As shown in FIG. 3, a conveying system according to one or more embodiments of the present application includes a server 101 and a conveying device 102. The server 101 is configured to determine a target conveying route from a plurality of candidate conveying routes according to a route planning model, and generate a conveying instruction according to the target conveying route and user order information. The conveying device 102 is configured to receive and analyze the conveying instruction, and convey a material from a source node of supply to a user node via at least one candidate warehouse according to an analyzing result.

Figure 4:
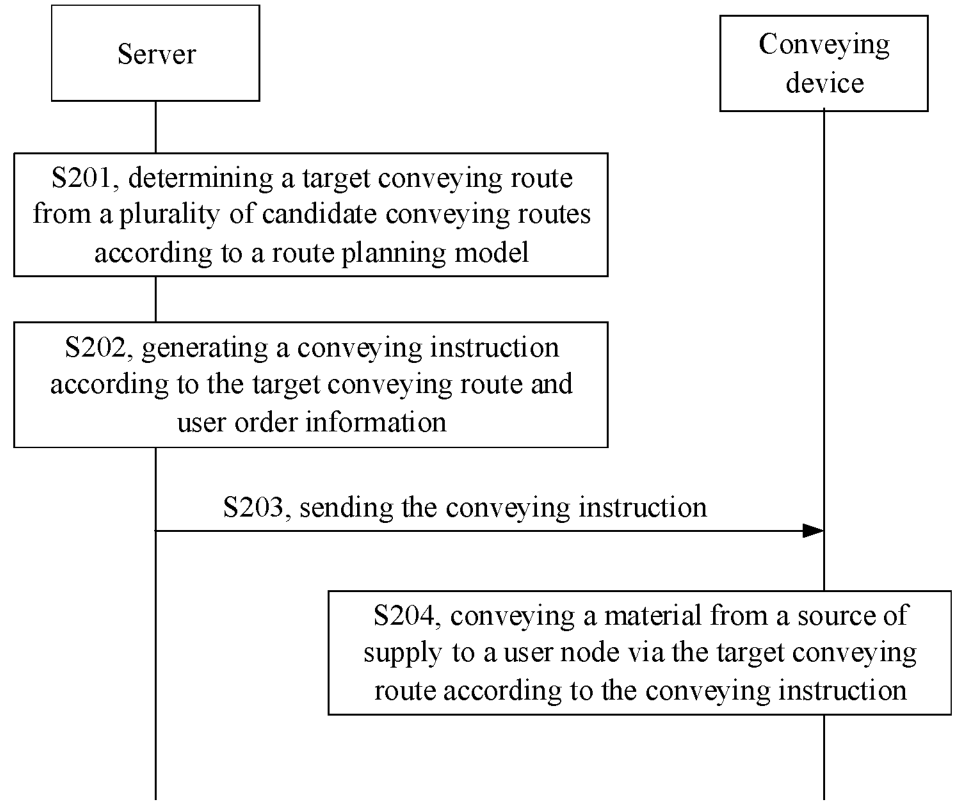
FIG. 4 is a flow diagram of a material conveying method according to another embodiment of the present application.

As shown in FIG. 4, according to another embodiment of the present application, a material conveying method applied to the above conveying system includes following steps.

S201, a server determines a target conveying route from a plurality of candidate conveying routes according to a route planning model.

The candidate conveying routes refer to routes from a certain source node of supply to a certain user node via at least one candidate warehouse. The route planning model is used to calculate conveying costs of each candidate conveying route. The route planning model is solved to obtain a candidate conveying route with a lowest conveying cost from the certain source node of supply to the certain user node, and the candidate conveying route with the lowest conveying cost is taken as the target conveying route from the certain source node of supply to the certain user node.

Preferably, the conveying cost may be a monetary cost, a time cost, or a combination of the monetary cost and the time cost.

S202, the server generates a conveying instruction according to the target conveying route and user order information.)

The user node and material information are obtained in the user order information, at least one target source node of supply is determined according to the material information, a target conveying route between each target source node of supply and the user node is obtained, a final conveying route is selected from a plurality of target conveying routes, and a material conveying instruction is generated according to the final conveying route.

For example, there are two source nodes of supply, which are successively marked as source node of supply A (hereinafter referred to as source of supply A) and source node of supply B (hereinafter referred to as source of supply B), and there are three user nodes, which are successively marked as user node A (hereinafter referred to as node A), user node B (hereinafter referred to as node B), and user node C (hereinafter referred to as node C). Six target conveying routes can be obtained in S201, which are successively from the source of supply A to the node A via at least one candidate warehouse, from the source of supply A to the node C via at least one candidate warehouse, from the source of supply A to the node B via at least one candidate warehouse, from the source of supply B to the node A via at least one candidate warehouse, from the source of supply B to the node B via at least one candidate warehouse, and from the source of supply B to the node C via at least one candidate warehouse.

There are cargo I and II at the source of supply A, and there is cargo III at the source of supply B, while the cargo I is required at the node A. Thus only the source of supply A can provide cargoes to the node A, then the conveying instruction is generated according to the target conveying route from the source of supply A to the node A.

S203, the server sends the conveying instruction to a conveying device.

S204, the conveying device conveys a material from a source node of supply to a user node via the target conveying route according to the conveying instruction.

After receiving the conveying instruction, the conveying device analyzes the conveying instruction to obtain a material conveying route, and the conveying device conveys the material from the source node of supply to the user node according to the target conveying route.

In the embodiments of the present application, a target conveying route is determined from a plurality of candidate conveying routes according to a route planning model, and a conveying instruction is generated according to the target conveying route and user order information, so as to control a conveying device to convey a material from a source node of supply to a user node via the target conveying route, so as to achieve material route planning and material transportation control. Since when determining the target conveying route, conveying costs and conveying time are taken as optimization objectives, the obtained target conveying route can ensure lowest conveying cost and shortest conveying time, so that when the conveying device is controlled to transport materials according to the obtained target conveying route, a cargo can be transported to the user node at the lowest cost and the shortest time. Moreover, this solution can adapt to conveying network constructions of any stage, and can be applied to a conveying network construction in the existing e-commerce sales mode and a conveying network construction in the new retailing mode.

In the material conveying method according to the embodiment of the present application, the server determines the target conveying route from the plurality of candidate conveying routes according to the route planning model. When processing a user order, at least one source node of supply may be determined according to information of a material required by a user, and a final conveying route is determined from target conveying routes which are from a respective source node of supply to a user node, so as to generate a conveying instruction according to the final conveying route, to achieve a lowest cost of conveying the material.

According to another embodiment of the present application, a material conveying method, which is applied to the above conveying system, includes following steps.

S301, a server determines a target conveying route from a plurality of candidate conveying routes according to a route planning model.

The route planning model is an integer linear planning model and the route planning model includes an objective function and a constraint set.

The objective function includes a conveying cost and conveying time. The conveying cost refers to a monetary cost when a candidate conveying route is used to convey a material, and the conveying time refers to a time cost when the candidate conveying route is used to convey the material. The conveying cost is obtained according to a route variable set and a conveying cost parameter of a respective candidate warehouse, and the conveying time is obtained according to the route variable set and a conveying time parameter of the respective candidate warehouse.

The route variable set includes variables from a first route variable to a fifth route variable. The first route variable indicates whether a certain candidate warehouse is selected to transmit a material to another candidate warehouse, the second route variable indicates whether a certain source node of supply provides a material to a certain candidate warehouse, the third route variable indicates whether a certain candidate warehouse provides a material to a user node, the fourth route variable indicates whether a certain source node of supply provides a material to a certain user node via at least one candidate warehouse, and the fifth route variable indicates whether to provide a material to the user node via a plurality of candidate warehouses.

Values of all route variables in the route variable set may be combined to obtain all optional candidate conveying routes from any source node of supply to any user node. That is, the objective function takes a conveying cost and conveying time of a candidate conveying route as an objective, and takes a candidate conveying route from a certain source node of supply to a certain user node obtained at the minimum of the objective function as the target conveying route.

The conveying cost includes an inventory cost for a candidate conveying route, a delivering cost for the candidate conveying route, and a transferring cost for the candidate conveying route.

The inventory cost refers to an inventory cost when a material is conveyed from a source node of supply via the candidate conveying route. The inventory cost further includes an inbound cost and an outbound cost. The inbound cost refers to an inbound cost from the source node of supply to a last stage candidate warehouse in the candidate conveying route, and the outbound cost includes a first outbound cost from the source node of supply to the last stage candidate warehouse in the candidate conveying route and a second outbound cost from the last stage candidate warehouse to a user node in the candidate conveying route. A number scale of a material conveyed between candidate warehouses is far greater than a number scale of a material conveyed from the last stage candidate warehouse to the user node. Calculation accuracy can be improved by separately calculating the outbound cost of material conveying between candidate warehouses and the outbound cost from the last stage candidate warehouse to the user node.

The inbound cost from the source node of supply to the last stage candidate warehouse in the candidate conveying route is determined according to a total number of a material provided by the last stage candidate warehouse to the user node, a single-piece inbound cost for the source node of supply, a single-piece inbound cost of a candidate warehouse, the first route variable, the second route variable, the third route variable, and the fourth route variable.

The first outbound cost from the source node of supply to the last stage candidate warehouse in the candidate conveying route is determined according to total volume of a material provided by the last stage candidate warehouse to the user node, an outbound cost by volume for the source node of supply, an outbound cost by volume for a candidate warehouse, the first route variable, the second route variable, the third route variable, and the fifth route variable.

The second outbound cost from the last stage candidate warehouse to the user node in the candidate conveying route includes a basic outbound cost and additional outbound cost. The basic outbound cost is determined according to an outbound cost for a first order of the last stage candidate warehouse, an outbound cost for a subsequent piece of the last stage candidate warehouse, the total number of a material provided by the last stage candidate warehouse to the user node, an order quantity of a user, the third route variable, and the fifth route variable. The additional outbound cost is determined according to a single-piece outbound cost for the last stage candidate warehouse, an outbound cost by volume for the last stage candidate warehouse, the total number of the material provided by the last stage candidate warehouse to the user node, the total volume of the material provided by the last stage candidate warehouse to the user node, the third route variable, and the fifth route variable.

The delivering cost is a delivering cost from the last stage candidate warehouse to the user node. The delivering cost is determined according to the order quantity of the user, total weight of a material required by the user, a delivering cost for a first order from the last stage candidate warehouse to the user node, a delivering cost for extra weight from the last stage candidate warehouse to the user node, the third route variable, and the fifth route variable.

The transferring cost refers to a cost for providing a material to the user node from other sources of supply. When the transferring cost is calculated, the transferring cost may be calculated according to total mass of a transferred material only, that is, a transferring cost for each candidate conveying route is determined according to total mass of a material provided by the last stage candidate warehouse to the user node, a single-piece transferring cost for the source node of supply, a single-piece transferring cost for a candidate warehouse, the first route variable, the second route variable, the third route variable, and the fourth route variable.

When the transferring cost is calculated, the transferring cost may be calculated according to total volume of the transferred material only. The transferring cost for each candidate conveying route is determined according to total volume of the material provided by the last stage candidate warehouse to the user node, the single-piece transferring cost for the source node of supply, the single-piece transferring cost for the candidate warehouse, the first route variable, the second route variable, the third route variable, and the fourth route variable.

When the transferring cost is calculated, the transferring cost may be calculated according to a combination of the total volume and the total mass of the transferred material only. The transferring cost for each candidate conveying route is determined according to the total volume of the material provided by the last stage candidate warehouse to the user node, the total mass of the material provided by the last stage candidate warehouse to the user node, the single-piece transferring cost for the source node of supply, the single-piece transferring cost for the candidate warehouse, the first route variable, the second route variable, the third route variable, and the fourth route variable.

The constraint set includes a first constraint for constraining the source node of supply to provide a material to at least one candidate warehouse, a second constraint for constraining one user node to receive a material from only one candidate warehouse, a third constraint for constraining that there is only one delivering route between one source node of supply and one user node, a fourth constraint for constraining a total number of candidate warehouses selected to transmit a material, and a fifth constraint for constraining time for the candidate conveying route.

The conveying time is determined according to the fifth route variable and a conveying time parameter of the last stage candidate warehouse.

After the above route planning model is built, the above model may be solved according to an existing solving method to obtain values of the respective route variable, and then the target conveying route from a certain source node of supply to a certain user node can be determined.

S302, the server generates a conveying instruction according to the target conveying route and user order information.

This step has been described in detail in the above embodiment, which will not be repeated here.

S303, the server sends the conveying instruction to a conveying device.

S304, the conveying device conveys a material from a source node of supply to a user node via the target conveying route according to the conveying instruction.

After receiving the conveying instruction, the conveying device analyzes the conveying instruction to obtain a material conveying route, and the conveying device conveys the material from the source node of supply to the user node according to the conveying route.

In the material conveying method according to the embodiment of the present application, by building the above route planning model, the target conveying route may be determined from a plurality of candidate conveying routes according to the model, and then a conveying route for transporting a material from one of the source nodes of supply to one user node may be selected from the target conveying route, and it can be guaranteed that time for material conveying is the shortest and the conveying cost is the lowest.

According to another embodiment of the present application, a material conveying method applied to the above conveying system includes following steps.

S401, a server determines a target conveying route from a plurality of candidate conveying routes according to a route planning model.

The objective function as shown in a following formula is built:

$$f = \min\left(w_1 \times \frac{C^*}{C_b} + w_2 \times \frac{T^*}{T_b}\right) \tag{1}$$

f represents the objective function, min(•) represents calculating a minimum value, $w_1$ represents a cost weight, $C^*$ represents a conveying cost, $C_b$ represents a cost benchmark value, $w_2$ represents a time weight, $T^*$ represents conveying time, and $T_b$ represents a time benchmark value. $w_1$, $C_b$, $w_2$ and $T_b$ may be obtained through a heuristic algorithm, that is, by assigning values to $w_1$, $C_b$, $w_2$ and $T_b$ based on experience, and then obtaining an optimal value through continuous optimization.

The conveying cost is calculated according to a following formula:

$$C^* = C_W + C_D + C_T \tag{2}$$

$C_W$ represents an inventory cost, $C_D$ represents a delivering cost, and $C_T$ represents a transferring cost.

A process of obtaining the inventory cost is described below.

The inventory cost is calculated according to a following formula:

$$C_W = C_{W1} + C_{W2} + C_{W3} \tag{3}$$

$C_{W1}$ represents an inbound cost from a source node of supply to a last stage candidate warehouse in a candidate conveying route, $C_{W2}$ represents a first outbound cost from the source node of supply to the last stage candidate warehouse in the candidate conveying route, and $C_{W3}$ represents a second outbound cost from the last stage candidate warehouse to a user node in the candidate conveying route.

$$C_{W1} = \sum_{o} \sum_{j^1 \ldots j^l} \sum_{i^1 \ldots i^l} \sum_{d} \Big[ ci_o^{wh} x_{oi^1} + ci_{i^1}^{wh} y_{i^1 j^1} + ci_{j^1}^{wh} y_{j^1 i^2} + \cdots + ci_{i^l}^{wh} y_{i^l j^l} + ci_{j^l}^{wh} z_{j^l d} \Big) y_{do} q_{j^l d} \Big] \tag{4}$$

$\Sigma_{j^1 \ldots j^l}(\ )$ represents a sum for all of $j^1, j^2, \ldots, j^{l-1}$ and $j^l$, and $\Sigma_{i^1 \ldots i^l}(\ )$ represents a sum for all of $i^1, i^2, \ldots, i^{l-1}$ and $i^l$, i and j both represent an identifier of a candidate warehouse, $1 \leq i, j \leq l$, l represents a total number of the candidate warehouse, d represents an identifier of a user node, $1 \leq d \leq m$, m represents a total number of the user node, o represents an identifier of a source node of supply, $1 \leq o \leq p$, p represents a total number of the source node of supply, $$ci_o^{wh}$$

represents a single-piece inbound cost for an $o_{th}$ source node of supply, $x_{oi^1}$ is a second route variable which represents whether the $o_{th}$ source node of supply provides a material to an $i^1{}_{th}$ candidate warehouse, $$ci_{i^1}^{wh}$$

represents a single-piece inbound cost for the $i^1{}_{th}$ candidate warehouse, $$ci_{j^1}^{wh}$$

represents a single-piece inbound cost for a $j^1{}_{th}$ candidate warehouse, $y_{i^1 j^1}$ is a first route variable which represents whether the $i^1{}_{th}$ candidate warehouse provides a material to the $j^1{}_{th}$ candidate warehouse, $y_{j^1 i^2}$ is a first route variable which represents whether the $j^1{}_{th}$ candidate warehouse provides a material to an $i^2{}_{th}$ candidate warehouse, $z_{j^l d}$ is a third route variable which represents whether a $j^l{}_{th}$ candidate warehouse provides a material to a $d_{th}$ user node, $y_{do}$ is a fourth route variable which represents whether the $o_{th}$ source node of supply provide a material to the $d_{th}$ user node via a candidate warehouse, $q_{j^l d}$ represents a total number of a material provided by the $j^l{}_{th}$ candidate warehouse to the $d_{th}$ user node, $i^1, i^2, \ldots, i^{l-1}$ and $i^l$ represent l values of i, $1 \leq i^1, i^2, \ldots, i^{l-1}, i^l \leq l$, $j^1, j^2, \ldots, j^{l-1}$ and $j^l$ represent l values of j, and $1 \leq j^1, j^2, \ldots, j^{l-1}, j^l \leq l$.

$$C_{W2} = \sum_{o} \sum_{j^1 \ldots j^l} \sum_{i^1 \ldots i^l} \sum_{d} \Big[ \Big( co_o^{wh} x_{oi^1} + co_{i^1}^{wh} y_{i^1 j^1} + co_{j^1}^{wh} y_{j^1 i^2} + \cdots + co_{i^l}^{wh} y_{i^l j^l} + \tag{5}$$

-continued $$co_{j^l}^{wh} z_{j^l d} \Big) y_{di^{l-1}} v_{i^{l-1} d} \Big]$$

$$co_o^{wh}$$

represents an outbound cost by volume for the $o_{th}$ source node of supply, $$co_{i^1}^{wh}$$

represents an outbound cost by volume for the $i^1{}_{th}$ candidate warehouse, $$co_{j^1}^{wh}$$

represents an outbound cost by volume for the $j^1{}_{th}$ candidate warehouse, $z_{j^l d}$ is a third route variable which represents whether the $j^l{}_{th}$ candidate warehouse provides a material to the $d_{th}$ user node, $y_{di}{}^{l-1}$ is a fifth route variable which represents whether a $i^{l-1}{}_{th}$ candidate warehouse provides a material to the $d_{th}$ user node via other candidate warehouses, $v_{i^{l-1} d}$ represents total volume of a material provided by the $i^{l-1}{}_{th}$ candidate warehouse to the $d_{th}$ user node, and for volume of a material whose volume is 0, total volume of the material is calculated according to a formula $v_{j^l d} = m_{j^l d} q_{j^l d} \gamma$, where $\gamma$ represents a foaming coefficient, $m_{j^l d}$ represents total mass of the material provided by the $j^l{}_{th}$ candidate warehouse to the $d_{th}$ user node.

$$C_{W3} = \sum_{o} \sum_{j^1 \ldots j^l} \sum_{i^1 \ldots i^l} \sum_{d} \Big[ cf_{j^l d}^{n} y_{dj^{l-1}} z_{j^l d} n_{j^l d} + cc_{j^l d}^{q} y_{dj^{l-1}} z_{j^l d} \big( q_{j^l d} - n_{j^l d} \big) (1 - \rho_d) + \rho_d \Big( co_{j^l d}^{v} y_{dj^{l-1}} z_{j^l d} v_{j^l d} + co_{j^l d}^{q} y_{dj^{l-1}} z_{j^l d} q_{j^l d} \Big) / 2 \Big] \tag{6}$$

$$cf_{j^l d}^{n}$$

represents an outbound cost for a first order when the $j^l{}_{th}$ candidate warehouse provides a material to the $d_{th}$ user node, $y_{dj^{l-1}}$ is a fifth route variable which represents whether the $j^{l-1}{}_{th}$ candidate warehouse provide a material to the $d_{th}$ user node via other candidate warehouses, $z_{j^l d}$ is a third route variable which represents whether the $j^l{}_{th}$ candidate warehouse provides a material to the $d_{th}$ user node, $n_{j^l d}$ represents an order quantity of a material provided by the $j^l{}_{th}$ candidate warehouse to the $d_{th}$ user node, $$cc_{j^l d}^{q}$$

represents an outbound cost for a subsequent piece when the $j^l{}_{th}$ candidate warehouse provides a material to the $d_{th}$ user node, $q_{j^l d}$ represents a total number of the material provided by the $j^1{}_{th}$ candidate warehouse to the $d_{th}$ user node, $\rho_d$ represents an adjustment coefficient, $$co^{v}_{j^l d}$$

represents an outbound cost by volume when the $j^l_{th}$ candidate warehouse provides the material to the $d_{th}$ user node, and $$co^{q}_{j^l d}$$

represents a single-piece outbound cost when the $j^l_{th}$ candidate warehouse provides the material to the $d_{th}$ user node.

A process of obtaining the delivering cost is described below, and the delivering cost is calculated according to a following formula:

$$C_D = \sum_d \sum_{j^l} \left[ cdf^{n}_{j^l d} y_{dj^{l-1}} z_{j^l d} n_{j^l d} + cdc^{q}_{j^l d} y_{dj^{l-1}} z^{j^l d} \left( m_{j^l d} - n_{j^l d} \right) \right] \tag{7}$$

$$cdf^{n}_{j^l d}$$

represents a delivering cost for a first order when the $j^l_{th}$ candidate warehouse provides the material to the dui user node, $$cdc^{q}_{j^l d}$$

represents a delivering cost for extra weight when the $j^l_{th}$ candidate warehouse provides the material to the $d_{th}$ user node, $m_{j^l d}$ represents total weight of the material provided by the $j^l_{th}$ candidate warehouse to the $d_{th}$ user node; for weight of a material whose weight is 0, weight is calculated according to a formula $m_{j^l d} = q_{j^l d} v_{j^l d} / \gamma$.

A process of obtaining the transferring cost is described below, and the transferring cost may be obtained in following three manners.

(1) When the transferring cost is calculated, if following conditions are satisfied:

$$\frac{\sum_{j=1}^{j=l} \sum_{d=1}^{d=m} v_{jd}}{\sum_{j=1}^{j=l} \sum_{d=1}^{d=m} m_{jd}} \le \alpha$$

α is a preset threshold value and is obtained according to actual demands.

That is, when a high-density material is transferred, the transferring cost may be calculated according to total mass of the transferred material only, which is specifically calculated according to a following formula:

$$C_T = \sum_{o} \sum_{j^1 \ldots j^l} \sum_{i^1 \ldots i^l} \sum_{d} \left( ctrans^{Bm}_{oi^1} x_{oi^1} + ctrans^{Bm}_{i^1 j^1} y_{i^1 j^1} + ctrans^{Bm}_{j^1 i^2} y_{j^1 i^2} + \cdots + ctrans^{Bm}_{i^l j^l} y_{i^l j^l} + ctrans^{Bm}_{j^l d} z_{j^l d} \right) y_{do} m_{j^l d} \tag{8}$$

$$ctrans^{Bm}_{oi^1}$$

represents a single-piece transferring cost from the $o_{th}$ source node of supply to $i^1_{th}$ candidate warehouse, $$ctrans^{Bm}_{i^1 j^1}$$

represents a single-piece transferring cost from the $i^1_{th}$ candidate warehouse to the $j^1_{th}$ candidate warehouse, $$ctrans^{Bm}_{i^1 j^2}$$

represents a single-piece transferring cost from the $j^1_{th}$ candidate warehouse to the $i^2_{th}$ candidate warehouse, $$ctrans^{Bm}_{j^l d}$$

represents a single-piece transferring cost from the $j^l_{th}$ candidate warehouse to the $d_{th}$ user node.

(2) When the transferring cost is calculated, if following conditions are satisfied:

$$\frac{\sum_{j=1}^{j=l} \sum_{d=1}^{d=m} v_{jd}}{\sum_{j=1}^{j=l} \sum_{d=1}^{d=m} m_{jd}} > \alpha$$

That is, when a low-density material is transferred, the transferring cost may be calculated according to total volume of the transferred material only, which is specifically calculated according to a following formula:

$$C_T = \sum_{o} \sum_{j^1 \ldots j^l} \sum_{i^1 \ldots i^l} \sum_{d} \left( ctrans^{Bm}_{oi^1} x_{oi^1} + ctrans^{Bm}_{i^1 j^1} y_{i^1 j^1} + ctrans^{Bm}_{j^1 i^2} y_{j^1 i^2} + \cdots + ctrans^{Bm}_{i^l j^l} y_{i^l j^l} + ctrans^{Bm}_{j^l d} \right) y_{do} v_{j^l d} \tag{9}$$

(3) When the transferring cost is calculated, the transferring cost may be calculated according to a combination of the total volume and the total mass of the transferred material, which is specifically calculated according to a following formula:

$$C_T = \sum_{o} \sum_{j^1 \ldots j^l} \sum_{i^1 \ldots i^l} \sum_{d} \left[ \left( ctrans^{Bm}_{oi^1} x_{oi^1} + ctrans^{Bm}_{i^1 j^1} y_{i^1 j^1} + ctrans^{Bm}_{j^1 i^2} y_{j^1 i^2} + \cdots + ctrans^{Bm}_{i^l j^l} y_{i^l j^l} + ctrans^{Bm}_{j^l d} \right) \left( m_{j^l d} + v_{j^l d} B \right) y_{do} \right] / 2 \tag{10}$$

B represents an adjustment coefficient between mass and volume and is obtained according to actual demands.

The delivering time is calculated according to a following formula:

$$T^* = \sum_{j^l}\sum_{d} T_{j^l d} z_{j^l d} \tag{11}$$

$T_{j^l d}$ represents a time parameter when the $j^l{}_{th}$ candidate warehouse provides a material to the $d_{th}$ user node.

The constraint set is described below, and the constraint set consists of formulas (12) to (21).

A first constraint is represented by formula (12):

$$\sum_{o}\sum_{i^1} x_{oi^1} \geq 1 \tag{12}$$

A second constraint is represented by formula (13):

$$\forall\, d \in D \sum_{j^l} z_{j^l d} = 1 \tag{13}$$

A third constraint is represented by formulas (14) to (19):

$$\sum_{o}\sum_{i^1, j^1} x_{oi^1} y_{i^1 j^1} \geq 1 \tag{14}$$

$$\forall\, i^1 \in I \sum_{o} x_{oi^1} \leq \sum_{j^1} y_{i^1 j^1} \tag{15}$$

$$\forall\, u \in I \sum_{j^u} y_{j^u i^{u+1}} \leq \sum_{j^{u+1}} y_{i^{u+1} j^{u+1}} \tag{16}$$

$$\forall\, u \in I \sum_{i^u} y_{i^u j^u} \leq \sum_{i^{u+1}} y_{j^u i^{u+1}} \tag{17}$$

$$\forall\, j^l \in I \sum_{i^l} y_{i^l j^l} \leq \sum_{d} z_{j^l d} \tag{18}$$

$$\sum_{O}\sum_{i^1}\sum_{i^1}\sum_{d} x_{oi^1} y_{i^1 j^1} y_{j^1 i^2} \cdots y_{i^l j^l} z_{j^l d} = 1 \tag{19}$$

A fourth constraint is represented by formula (20):

$$N_{min} \leq \sum_{O}^{o} \sum_{j^1 \ldots j^l} \sum_{i^1 \ldots i^l} \sum_{d} x_{oi^1} y_{i^1 j^1} y_{j^1 i^2} \cdots y_{j^{l-3} i^{l-2}} \cdots z_{j^l d} \left( x_{oi} + y_{i^1 j^1} + y_{j^1 i^2} + \cdots + y_{j^{l-2} i^{l-1}} + \cdots + z_{j^l d} \right) \leq N_{max} \tag{20}$$

A fifth constraint is represented by formula (21):

$$\frac{\sum_{d=1}^{d=m} \sum_{j^l=1}^{j^l=l} T_{j^l d} z_{j^l d}}{\sum_{d=1}^{d=m} \sum_{j^l=1}^{j^l=l} n_{j^l d}} \geq \beta \tag{21}$$

D={1, 2, . . . m}, I={1, 2, . . . l}; $i^u$ represents u values of i, $j^u$ represents u values of j, $N_{min}$ represents a minimum number of the candidate warehouse, $N_{max}$ represents a maximum number of the candidate warehouse, $T_{j^l d}$ represents delivering time for providing a material by the $j^l{}_{th}$ candidate warehouse to the $d_{th}$ user node, and β represents probability of a minimum time.

It should be noted that values of variables from the first route variable to the fifth route variable are 0 or 1. If a certain route variable represents 0, it means that the route is not selected; and if a route variable is 1, it means that the route is selected. Then whether a candidate warehouse is selected may be determined according to all the route variables. That is, if a route passes through the candidate warehouse, the candidate warehouse is selected.

After the above model is built, the above model may be solved according to a solution method of an existing technology, for example, a conventional integer linear solution method.

S402, the server generates a conveying instruction according to a conveying route of a conveying warehouse and user order information.

S403, the server sends the conveying instruction to a conveying device.

S404, the conveying device conveys a material from a source node of supply to a user node via a multi-stage conveying network according to the conveying instruction.

S302 to S304 have been described in detail in the above embodiment, which will not be repeated here.)

In the material conveying method according to the embodiment of the present application, by building the above route planning model, the target conveying route may be determined from a plurality of candidate conveying routes according to the model, and then a conveying route for transporting a material from one of the source nodes of supply to one user node may be determined according to the target conveying route, and it can be guaranteed that time for material conveying is the shortest and the conveying cost is the lowest.

Figure 5:
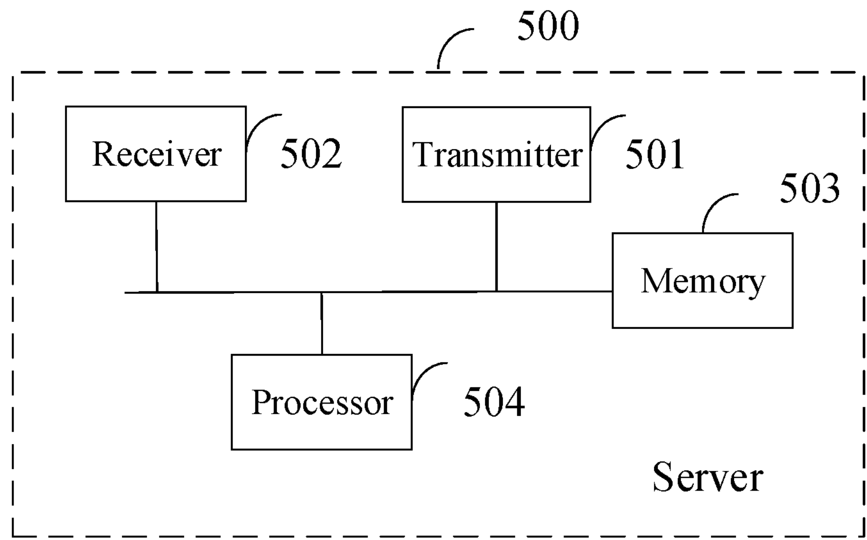
FIG. 5 is a structural diagram of a server according to another embodiment of the present application.

As shown in FIG. 5, a server 500 according to another embodiment of the present application includes a transmitter 501, a receiver 502, a memory 503, and a processor 502.

The transmitter 501 is configured to send an instruction and data;

the receiver 502 is configured to receive an instruction and data;

the memory 503 is configured to store a computer executable instruction; and the processor 504 is configured to execute the computer executable instruction stored in the memory to implement various steps performed by the material conveying method in the above embodiment. For details, please refer to the relevant description in the previous material conveying method embodiment.

In the embodiments of the present application, the memory 503 may be independent or integrated with the processor 504. When the memory 503 is set independently, the processing device further includes a bus for connecting the memory 503 and the processor 504.

According to the embodiments of the present application, a computer readable storage medium stores a computer executable instruction. When a processor executes the computer executable instruction, the material conveying method performed by the above processing device is realized.

It should be noted that the computer readable medium described in the embodiments of the present application may be a computer readable signal medium or a computer readable storage medium or any combination thereof. The computer readable storage medium may be, for example, but not limited to, an electrical, magnetic, optical, electromagnetic, infrared, or semiconductor system, apparatus or equipment, or any combination thereof. More specific examples of the computer readable storage medium may include, but are not limited to, an electrical connection with one or more wires, a portable computer disk, a hard disk, a random-access memory (RAM), a read-only memory (ROM), an erasable programmable read-only memory (EPROM) or a flash memory, an optical fiber, a portable compact disk read-only memory (CD-ROM), an optical storage equipment, a magnetic storage equipment, or any suitable combination thereof. In the embodiments of the present application, the computer readable storage medium may be any tangible medium that contains or stores a program, and the program may be used by or in combination with an instruction executing system, apparatus or equipment. In the embodiments of the present application, the computer readable signal medium may include a data signal propagated in baseband or as a part of a carrier wave, in which computer readable program code is carried. This kind of propagated data signal may be in a plurality of forms, including but not limited to an electromagnetic signal, an optical signal or any suitable combination thereof. The computer readable signal medium may also be any computer readable medium other than the computer readable storage medium, and the computer readable signal medium may send, propagate or transmit a program which is used by or in combination with an instruction executing system, apparatus or equipment. Program code contained in the computer readable medium may be transmitted by any suitable medium, including but not limited to: an electric wire, an optical cable, RF (radio frequency), etc., or any suitable combination thereof.

According to the embodiments of the present application, a computer program product includes a computer program/instruction, and when the computer program/instruction is executed by a processor, the material conveying method described in the above embodiment is implemented.

Finally, it should be noted that the above embodiments are only used to explain technical solutions of the present application, not to limit them; although the present application has been described in detail with reference to the above embodiments, persons skilled in the art should understand that they can still modify technical solutions recited in the above embodiments, or equivalently replace some or all of technical features therein; however, these modifications or substitutions do not make nature of corresponding technical solutions separate from scope of the technical solutions of the embodiments in the present application.

The invention claimed is:

1. A material conveying method, applied to a server, the method comprises:

determining a target conveying route from a plurality of candidate conveying routes according to a route planning model; wherein the candidate conveying routes refer to routes from a source node of supply to a user node via at least one candidate warehouse;

generating a conveying instruction according to the target conveying route and user order information; and sending the conveying instruction for actively controlling a conveying device to convey a material from the source node of supply to the user node via the target conveying route, wherein the route planning model comprises an objective function and the objective function comprises a conveying cost and conveying time;

wherein the conveying cost is obtained according to a route variable set and a conveying cost parameter of a respective candidate warehouse, and the conveying time is obtained according to the route variable set and a conveying time parameter of the respective candidate warehouse;

wherein the conveying cost comprises an inventory cost for a candidate conveying route, a delivering cost for the candidate conveying route, and a transferring cost for the candidate conveying route; and wherein the route variable set comprises a first route variable, a second route variable, a third route variable, a fourth route variable, and a fifth route variable, wherein the first route variable represents whether a certain candidate warehouse is selected to transmit a material to another candidate warehouse, the second route variable represents whether a certain source node of supply provides a material to a certain candidate warehouse, the third route variable indicates whether a certain candidate warehouse provides a material to a user node, the fourth route variable indicates whether a certain source node of supply provides a material to a certain user node via at least one candidate warehouse, and the fifth route variable indicates whether to provide a material to the user node via a plurality of candidate warehouses, wherein the objective function comprises:

$$f = \min\left(w_1 \times \frac{C^*}{C_b} + w_2 \times \frac{T^*}{T_b}\right)$$

wherein f represents the objective function, min(•) represents calculating a minimum value, $w_1$ represents a cost weight, $C^*$ represents a conveying cost, $C_b$ represents a cost benchmark value, $w_2$ represents a time weight, $T^*$ represents conveying time, and $T_b$ represents a time benchmark value;

wherein the conveying cost is calculated according to a first formula, and the first formula comprises:

$$C^* = C_W + C_D + C_T$$

wherein $C_W$ represents an inventory cost, $C_D$ represents a delivering cost, and $C_T$ represents a transferring cost;

wherein the inventory cost is calculated according to a second formula, and the second formula comprises:

$$C_W = C_{W1} + C_{W2} + C_{W3}$$

$C_{W1}$ represents an inbound cost, $C_{W2}$ represents a first outbound cost, and $C_{W3}$ represents a second outbound cost;

wherein the inbound cost is calculated according to a third formula, and the third formula comprises:

$$C_{W1} = \sum_{o} \sum_{j^1 \ldots j^l} \sum_{i^1 \ldots i^l} \sum_{d} \left[ ci_o^{wh} x_{oi^1} + ci_{i^1}^{wh} y_{i^1 j^1} + ci_{j^1}^{wh} y_{j^1 i^2} + \ldots + ci_{i^l}^{wh} y_{i^l j^l} + ci_{j^l}^{wh} z_{j^l d} \right) y_{do} q_{j^l d} \Big]$$

i and j both represent an identifier of a candidate warehouse, 1≤i, j≤l, l represents a total number of the candidate warehouse, d represents an identifier of a user node, 1≤d≤m, m represents a total number of the user node, o represents an identifier of a source node of supply, 1≤0≤p, p represents a total number of the source node or supply, $$ci_o^{wh}$$

represents a single-piece inbound cost for an $o_{th}$ source node of supply, $X_{oi^1}$ is a second route variable which represents whether the $o_{th}$ source node of supply provides a material to an $i^1{}_{th}$ candidate warehouse, $$ci_{i^1}^{wh}$$

represents a single-piece inbound cost for the $i^1{}_{th}$ candidate warehouse, $$ci_{j^1}^{wh}$$

represents a single-piece inbound cost for a $j^1{}_{th}$ candidate warehouse per piece, $y_{i^1j^1}$ is a first route variable which represents whether the $i^1{}_{th}$ candidate warehouse provides a material to the $j^1{}_{th}$ candidate warehouse, $y_{j^1i^2}$ represents whether the $j^1{}_{th}$ candidate warehouse provides a material to an $i^2{}_{th}$ candidate warehouse, $z_{j^ld}$ is a third route variable which represents whether a $j^l{}_{th}$ candidate warehouse provides a material to a $d_{th}$ user node, $y_{do}$ is a fourth route variable which represents whether the $o_{th}$ source node of supply provide a material to the $d_{th}$ user node via a candidate warehouse, $q_{j^ld}$ represents a total number of the material provided by the $j^l{}_{th}$ candidate warehouse to the $d_{th}$ user node, $i^1$, $i^2$, . . . , $i^{l-1}$ and $i^l$ represent l values of i, $j^1$, $j^2$, . . . , $j^{l-1}$ and $j^l$ represent l values of j;

wherein the first outbound cost is calculated according to a fourth formula, and the fourth formula comprises:

$$C_{W2} = \sum_o \sum_{j^1 \ldots j^l} \sum_{i^1 \ldots i^l} \sum_d \left[\left(co_o^{wh} x_{oi^1} + co_{i^1}^{wh} y_{i^1j^1} + co_{j^1}^{wh} y_{j^1i^2} + \ldots + co_{i^l}^{wh} y_{i^lj^l} + co_{j^l}^{wh} z_{j^ld}\right) y_{di^{l-1}} v_{i^{l-1}d}\right]$$

wherein $$co_o^{wh}$$

represents an outbound cost by volume for the $o_{th}$ source node of supply, $$co_{i^1}^{wh}$$

represents an outbound cost by volume for the $j^1{}_{th}$ candidate warehouse, $$co_{j^1}^{wh}$$

represents an outbound cost by volume for the $j^1{}_{th}$ candidate warehouse, $z_{j^ld}$ is the third route variable which represents whether the $j^l{}_{th}$ candidate warehouse provides a material to the $d_{th}$ user node, $y_{di^{l-1}}$ is a fifth route variable which represents whether an $i^{l-1}{}_{th}$ candidate warehouse provides a material to the $d_{th}$ user node via other candidate warehouses, $V_{i^{l-1}d}$ represents total volume of the material provided by the $i^{l-1}{}_{th}$ candidate warehouse to the $d_{th}$ user node;

wherein the second outbound cost is calculated according to a fifth formula, and the fifth formula comprises:

$$C_{W3} = \sum_o \sum_{j^1 \ldots j^l} \sum_{i^1 \ldots i^l} \sum_d \left[cf^n_{j^ld} y_{dj^{l-1}} z_{j^ld} n_{j^ld} + cc^q_{j^ld} y_{dj^{l-1}} z_{j^ld}\left(q_{j^ld} - n_{j^ld}\right)(1 - \rho_d) + \rho_d\left(co^v_{j^ld} y_{dj^{l-1}} z_{j^ld} v_{j^ld} + co^q_{j^ld} y_{dj^{l-1}} z_{j^ld} q_{j^ld}\right) / 2\right]$$

wherein $$cf^n_{j^ld}$$

represents an outbound cost for a first order when the $j^l{}_{th}$ candidate warehouse provides the material to the $d_{th}$ user node, $y_{dj^{l-1}}$ is the fifth route variable which represents whether a $j^{l-1}{}_{th}$ candidate warehouse provide a material to the $d_{th}$ user node via other candidate warehouses, $z_{j^ld}$ is the third route variable which represents whether a $j^l{}_{th}$ candidate warehouse provides a material to the $d_{th}$ user node, $n_{j^ld}$ represents an order quantity of the material provided by the $j^l{}_{th}$ candidate warehouse to the $d_{th}$ user node, $$cc^q_{j^ld}$$

represents an outbound cost for a subsequent piece when the $j^l{}_{th}$ candidate warehouse provides the material to the $d_{th}$ user node, $q_{j^ld}$ represents a total number of the material provided by the $j^l{}_{th}$ candidate represents an warehouse to the $d_{th}$ user node, $\rho_d$ represents an adjustment coefficient, $$co^v_{j^ld}$$

represents an outbound cost by volume when the $j^l{}_{th}$ candidate warehouse provides the material to the $d_{th}$ user node, and $$co^q_{j^ld}$$

represents a single-piece outbound cost when the $j^l{}_{th}$ candidate warehouse provides the material to the $d_{th}$ user node;

wherein the delivering cost is calculated according to a sixth formula, and the sixth formula comprises:

$$C_D = \sum_d \sum_{j^l} \left[ cdf^n_{j^l d} y_{dj^{l-1}} z_{j^l d} n_{j^l d} + cdc^q_{j^l d} y_{dj^{l-1}} z_{j^l d} \left( m_{j^l d} - n_{j^l d} \right) \right]$$

wherein $$cdf^n_{j^l d}$$

represents a delivering cost for a first order when the $j^l_{th}$ candidate warehouse provides the material to the $d_{th}$ user node, $$cdc^q_{j^l d}$$

represents a delivering cost for extra weight when the $j^l_{th}$ candidate warehouse provides the material to the $d_{th}$ user node, $m_{j^l d}$ represents total weight of the material provided by the $j^l_{th}$ candidate warehouse to the $d_{th}$ user node;

wherein the delivering time is calculated according to a seventh formula, and the seventh formula comprises:

$$T^* = \sum_{j^l} \sum_d T_{j^l d} z_{j^l d}$$

$T_{j^l d}$ represents a conveying time parameter when the $j^l_{th}$ candidate warehouse provides the material to the $d_{th}$ user node.

2. The method according to claim 1, wherein the inventory cost for the candidate conveying route comprises:

an inbound cost from the source node of supply to a last stage candidate warehouse in the candidate conveying route, a first outbound cost from the source node of supply to the last stage candidate warehouse in the candidate conveying route, and a second outbound cost from the last stage candidate warehouse to the user node in the candidate conveying route;

wherein the inbound cost is determined according to a total number of a material provided by the last stage candidate warehouse to the user node, a single-piece inbound cost for the source node of supply, a single-piece inbound cost for the candidate warehouse, the first route variable, the second route variable, the third route variable, and the fourth route variable;

the first outbound cost is determined according to total volume of the material provided by the last stage candidate warehouse to the user node, an outbound cost by volume for the source node of supply, an outbound cost by volume for the candidate warehouse, the first route variable, the second route variable, the third route variable, and the fifth route variable.

3. The method according to claim 2, wherein the second outbound cost comprises a basic outbound cost and an additional outbound cost;

wherein the basic outbound cost is determined according to an outbound cost for a first order of the last stage candidate warehouse, an outbound cost for a subsequent piece of the last stage candidate warehouse, a total number of the material provided by the last stage candidate warehouse to the user node, an order quantity of a user, the third route variable, and the fifth route variable; and the additional outbound cost is determined according to a single-piece outbound cost for the last stage candidate warehouse, an outbound cost by volume for the last stage candidate warehouse, the total number of the material provided by the last stage candidate warehouse to the user node, the total volume of the material provided by the last stage candidate warehouse to the user node, the third route variable, and the fifth route variable.

4. The method according to claim 1, wherein the delivering cost is determined according to an order quantity of the user, total weight of a material required by a user, a delivering cost for a first order from a last stage candidate warehouse to the user node, a delivering cost for extra weight from the last stage candidate warehouse to the user node, the third route variable, and the fifth route variable.

5. The method according to claim 1, wherein:

the transferring cost is determined according to total mass of a material provided by a last stage candidate warehouse to the user node, a single-piece transferring cost for the source node of supply, a single-piece transferring cost for the candidate warehouse, the first route variable, the second route variable, the third route variable, and the fourth route variable; or the transferring cost is determined according to total volume of the material provided by the last stage candidate warehouse to the user node, a single-piece transferring cost for the source node of supply, a single-piece transferring cost for the candidate warehouse, the first route variable, the second route variable, the third route variable, and the fourth route variable; or the transferring cost is determined according to total volume of the material provided by the last stage candidate warehouse to the user node, total mass of the materials provided by the last stage candidate warehouse to the user node, a single-piece transferring cost for the source node of supply, a single-piece transferring cost for the candidate warehouse, the first route variable, the second route variable, the third route variable, and the fourth route variable.

6. The method according to claim 1, wherein the conveying time is determined according to the fifth route variable and a conveying time parameter of a last stage candidate warehouse.

7. The method according to claim 1, wherein the route planning model comprises a constraint set;

wherein the constraint set comprises a first constraint for constraining the source node of supply to provide a material to at least one candidate warehouse, a second constraint for constraining one user node to receive a material from only one candidate warehouse, a third constraint for constraining that only one delivering route exists between one source node of supply and one customer node, a fourth constraint for constraining a total number of candidate warehouses selected to transmit a material, and a fifth constraint for constraining time for the candidate conveying route.

8. The method according to claim 7, wherein:

the first constraint comprises:

$$\sum_{o}\sum_{i^1} x_{oi^1} \geq 1$$

the second constraint comprises:

$$\forall\, d \in D \sum_{j^l} z_{j^l d} = 1$$

wherein D={1, 2, . . . m};

the third constraint comprises:

$$\sum_{o}\sum_{i^1, j^1} x_{oi^1} y_{i^1 j^1} \geq 1$$

$$\forall\, i^1 \in I \sum_{o} x_{oi^1} \leq \sum_{j^1} y_{i^1 j^1}$$

$$\forall\, u \in I \sum_{j^u} y_{j^u i^{u+1}} \leq \sum_{j^{u+1}} y_{i^{u+1} j^{u+1}}$$

$$\forall\, u \in I \sum_{i^u} y_{i^u j^u} \leq \sum_{i^{u+1}} y_{j^u i^{u+1}}$$

$$\forall\, j^l \in I \sum_{i^l} y_{i^l j^l} \leq \sum_{d} z_{j^l d}$$

$$\sum_{O}\sum_{j^1 \ldots j^l}\sum_{i^1 \ldots i^l}\sum_{d} x_{oi^1} y_{i^l j^l} y_{j^1 i^2} \ldots y_{i^l j^l} z_{j^l d} = 1$$

wherein I={1, 2, . . . l}; $i^u$ represents u values of i, $j^u$ represents u values of j, 1≤u≤l;

the fourth constraint comprises:

$$N_{min} \leq \sum_{O}\sum_{j^1 \ldots j^l}\sum_{i^1 \ldots i^l}\sum_{d} x_{oi^1} y_{i^l j^l} y_{j^1 i^2} \ldots y_{j^{l-3} i^{l-2}} \ldots z_{j^l d}\left(x_{oi^1} + y_{i^1 j^1} + y_{j^1 i^2} + \ldots + y_{j^{l-2} i^{l-1}} + \ldots + z_{j^l d}\right) \leq N_{max}$$

$N_{min}$ represents a minimum number of the candidate warehouse, $N_{max}$ represents a maximum number of the candidate warehouse;

the fifth constraint comprises:

$$\frac{\sum_{d}\sum_{j^l} T_{j^l d} z_{j^l d}}{\sum_{d}\sum_{j^l} n_{j^l d}} \geq \beta$$

$T_{j^l d}$ represents delivering time for providing the material by the $j^l_{th}$ candidate warehouse to the $d_{th}$ user node, and β represents probability of a minimum time.

9. The method according to claim 1, wherein:

the transferring cost is calculated according to an eighth formula, and the eighth formula comprises:

$$C_T = \sum_{o}\sum_{i^1 \ldots i^l}\sum_{j^1 \ldots j^l}\sum_{d}\left(ctrans^{Bm}_{oi^1} x_{oi^1} + ctrans^{Bm}_{i^1 j^1} y_{i^1 j^1} + ctrans^{Bm}_{j^1 i^2} y_{j^1 i^2} + \ldots + ctrans^{Bm}_{i^l j^l} y_{i^l j^l} + ctrans^{Bm}_{j^l d} z_{j^l d}\right) y_{do} m_{j^l d}$$

wherein $$ctrans^{Bm}_{oi^1}$$

represents a single-piece transferring cost from the $o_{th}$ source node of supply to $i^1_{th}$ candidate warehouse, $$ctrans^{Bm}_{i^1 j^1}$$

represents a single-piece transferring cost from the $i^1_{th}$ candidate warehouse to the $j^1_{th}$ candidate warehouse, $$ctrans^{Bm}_{j^1 i^2}$$

represents a single-piece transferring cost from the $j^1_{th}$ candidate warehouse to the $i^2_{th}$ candidate warehouse, $$ctrans^{Bm}_{j^l d}$$

represents a single-piece transferring cost from the $j^l_{th}$ candidate warehouse to the $d_{th}$ user node;

or, the transferring cost is calculated according to a ninth formula, and the ninth formula comprises:

$$C_T = \sum_{o}\sum_{j^1 \ldots j^l}\sum_{i^1 \ldots i^l}\sum_{d}\left(ctrans^{Bm}_{oi^1} x_{oi^1} + ctrans^{Bm}_{i^1 j^1} y_{i^1 j^1} + ctrans^{Bm}_{j^1 i^2} y_{j^1 i^2} + \ldots + ctrans^{Bm}_{i^l j^l} y_{i^l j^l} + ctrans^{Bm}_{j^l d}\right) y_{do} v_{j^l d}$$

or, wherein the transferring cost is calculated according to a tenth formula, and the tenth formula comprises:

$$C_T = \sum_{o}\sum_{j^1 \ldots j^l}\sum_{i^1 \ldots i^l}\sum_{d}\left[\left(ctrans^{Bm}_{oi^1} x_{oi^1} + ctrans^{Bm}_{i^1 j^1} y_{i^1 j^1} + ctrans^{Bm}_{j^1 i^2} y_{j^1 i^2} + \ldots + ctrans^{Bm}_{i^l j^l} y_{i^l j^l} + ctrans^{Bm}_{j^l d}\right)\left(m_{j^l d} + v_{j^l d} B\right) y_{do}\right] / 2$$

wherein B represents an adjustment coefficient between mass and volume.

10. A non-transitory computer readable storage medium, wherein the computer readable storage medium stores a computer executable instruction, and the computer executable instruction is used to implement the material conveying method according to claim 1 when executed by a processor.

11. The method according to claim 1, wherein the determining a target conveying route from a plurality of candidate conveying routes according to a route planning model, and generating a conveying instruction according to the target conveying route and user order information, comprises:

obtaining the user node and material information in the user order information;

determining at least one target source node of supply according to the material information;

obtaining at least one target conveying route between each of the at least one target source node of supply and the user node;

selecting a final conveying route from the at least one target conveying route; and generating the conveying instruction according to the final conveying route.

12. The method according to claim 1, wherein after receiving the conveying instruction, the conveying device analyzes the conveying instruction to obtain the target conveying route, and the conveying device conveys the material from the source node of supply to the user node according to the target conveying route.

13. A server, comprising a memory and a processor, the memory is configured to store an instruction executable by the processor;

wherein the processor is configured to:

determine a target conveying route from a plurality of candidate conveying routes according to a route planning model; wherein the candidate conveying routes refer to routes from a source node of supply to a user node via at least one candidate warehouse;

generate a conveying instruction according to the target conveying route and user order information; and send the conveying instruction for actively controlling a conveying device to convey a material from the source node of supply to the user node via the target conveying route, wherein the route planning model comprises an objective function and the objective function comprises a conveying cost and conveying time;

wherein the conveying cost is obtained according to a route variable set and a conveying cost parameter of a respective candidate warehouse, and the conveying time is obtained according to the route variable set and a conveying time parameter of the respective candidate warehouse;

wherein the conveying cost comprises an inventory cost for a candidate conveying route, a delivering cost for the candidate conveying route, and a transferring cost for the candidate conveying route; and wherein the route variable set comprises a first route variable, a second route variable, a third route variable, a fourth route variable, and a fifth route variable, wherein the first route variable represents whether a certain candidate warehouse is selected to transmit a material to another candidate warehouse, the second route variable represents whether a certain source node of supply provides a material to a certain candidate warehouse, the third route variable indicates whether a certain candidate warehouse provides a material to a user node, the fourth route variable indicates whether a certain source node of supply provides a material to a certain user node via at least one candidate warehouse, and the fifth route variable indicates whether to provide a material to the user node via a plurality of candidate warehouses, wherein the objective function comprises:

$$f = \min\left(w_1 \times \frac{C^*}{C_b} + w_2 \times \frac{T^*}{T_b}\right)$$

wherein f represents the objective function, min(•) represents calculating a minimum value, $w_1$ represents a cost weight, $C^*$ represents a conveying cost, $C_b$ represents a cost benchmark value, $w_2$ represents a time weight, $T^*$ represents conveying time, and $T_b$ represents a time benchmark value;

wherein the conveying cost is calculated according to a first formula, and the first formula comprises:

$$C^* = C_W + C_D + C_T$$

wherein $C_W$ represents an inventory cost, $C_D$ represents a delivering cost, and $C_T$ represents a transferring cost;

wherein the inventory cost is calculated according to a second formula, and the second formula comprises:

$$C_W = C_{W1} + C_{W2} + C_{W3}$$

$C_{W1}$ represents an inbound cost, $C_{W2}$ represents a first outbound cost, and $C_{W3}$ represents a second outbound cost;

wherein the inbound cost is calculated according to a third formula, and the third formula comprises:

$$C_{W1} = \sum_{o} \sum_{j^1 \ldots j^l} \sum_{i^1 \ldots i^l} \sum_{d} \Big[ ci_o^{wh} x_{oi^1} + ci_{i^1}^{wh} y_{i^1 j^1} + ci_{j^1}^{wh} y_{j^1 i^2} + \ldots + ci_{i^l}^{wh} y_{i^l j^l} + ci_{j^l}^{wh} z_{j^l d} \Big) y_{do} q_{j^l d} \Big]$$

i and j both represent an identifier of a candidate warehouse, 1≤i, j≤l, l represents a total number of the candidate warehouse, d represents an identifier of a user node, 1≤d≤m, m represents a total number of the user node, o represents an identifier of a source node of supply, 1≤0≤p, p represents a total number of the source node of supply, $$ci_o^{wh}$$

represents a single-piece inbound cost for an $o_{th}$ source node of supply, $x_{oi^1}$ is a second route variable which represents whether the $o_{th}$ source node of supply provides a material to an $i^1{}_{th}$ candidate warehouse, $$ci_{i^1}^{wh}$$

represents a single-piece inbound cost for the $i^1{}_{th}$ candidate warehouse, $$ci^{wh}_{j^1}$$

represents a single-piece inbound cost for a $j^1{}_{th}$ candidate warehouse per piece, $y_{i^1j^1}$ is a first route variable which represents whether the $i^1{}_{th}$ candidate warehouse provides a material to the $j^1{}_{th}$ candidate warehouse, $y_{j^1i^2}$ represents whether the $j^1{}_{th}$ candidate warehouse provides a material to an $i^2{}_{th}$ candidate warehouse, $z_{j^ld}$ is a third route variable which represents whether a $j^l{}_{th}$ candidate warehouse provides a material to a $d_{th}$ user node, $y_{do}$ is a fourth route variable which represents whether the $o_{th}$ source node of supply provide a material to the $d_{th}$ user node via a candidate warehouse, $q_{j^ld}$ represents a total number of the material provided by the $j^l{}_{th}$ candidate warehouse to the $d_{th}$ user node, $i^1$, $i^2$, . . . , $i^{l-1}$ and $i^l$ represent l values of i, $j^1$, $j^2$, . . . , $j^{l-1}$ and $j^l$ represent l values of j;

wherein the first outbound cost is calculated according to a fourth formula, and the fourth formula comprises:

$$C_{W2} = \sum_{o}\sum_{j^1 \ldots j^l}\sum_{i^1 \ldots i^l}\sum_{d}\Big[\Big(co^{wh}_{o}x_{oi^1} + co^{wh}_{i^1}y_{i^1j^1} + co^{wh}_{j^1}y_{j^1i^2} + \ldots + co^{wh}_{i^l}y_{i^lj^l} + co^{wh}_{j^l}z_{j^ld}\Big)y_{di^{l-1}}v_{i^{l-1}d}\Big]$$

wherein $$co^{wh}_{o}$$

represents an outbound cost by volume for the $o_{th}$ source node of supply, $$co^{wh}_{i^1}$$

represents an outbound cost by volume for the $i^1{}_{th}$ candidate warehouse, $$co^{wh}_{j^1}$$

represents an outbound cost by volume for the $j^1{}_{th}$ candidate warehouse, $z_{j^ld}$ is the third route variable which represents whether the $j^l{}_{th}$ candidate warehouse provides a material to the $d_{th}$ user node, $y_{di^{l-1}}$ is a fifth route variable which represents whether an $i^{l-1}{}_{th}$ candidate warehouse provides a material to the $d_{th}$ user node via other candidate warehouses, $v_{i^{l-1}d}$ represents total volume of the material provided by the $i^{l-1}{}_{th}$ candidate warehouse to the $d_{th}$ user node;

wherein the second outbound cost is calculated according to a fifth formula, and the fifth formula comprises:

$$C_{W3} = \sum_{o}\sum_{j^1 \ldots j^l}\sum_{i^1 \ldots i^l}\sum_{d}\Big[cf^{n}_{j^ld}y_{dj^{l-1}}z_{j^ld}n_{j^ld} + cc^{q}_{j^ld}y_{dj^{l-1}}z_{j^ld}\big(q_{j^ld} - n_{j^ld}\big)(1-\rho_d) + \rho_d\big(co^{v}_{j^ld}y_{dj^{l-1}}z_{j^ld}v_{j^ld} + co^{q}_{j^ld}y_{dj^{l-1}}z_{j^ld}q_{j^ld}\big)/2\Big]$$

wherein $$cf^{n}_{j^ld}$$

represents an outbound cost for a first order when the $j^l{}_{th}$ candidate warehouse provides the material to the $d_{th}$ user node, $y_{dj^{l-1}}$ is the fifth route variable which represents whether a $j^{l-1}{}_{th}$ candidate warehouse provide a material to the $d_{th}$ user node via other candidate warehouses, $z_{j^ld}$ is the third route variable which represents whether a $j_l{}^{th}$ candidate warehouse provides a material to the $d_{th}$ user node, $n_{j^ld}$ represents an order quantity of the material provided by the $j^l{}_{th}$ candidate warehouse to the $d_{th}$ user node, $$cc^{q}_{j^ld}$$

represents an outbound cost for a subsequent piece when the $j^l{}_{th}$ candidate warehouse provides the material to the $d_{th}$ user node, $q_{j^ld}$ represents a total number of the material provided by the $j^l{}_{th}$ candidate warehouse to the $d_{th}$ user node, $\rho_d$ represents an adjustment coefficient, $$co^{v}_{j^ld}$$

represents an outbound cost by volume when the $j^l{}_{th}$ candidate warehouse provides the material to the $d_{th}$ user node, and $$co^{q}_{j^ld}$$

represents a single-piece outbound cost when the $j^l{}_{th}$ candidate warehouse provides the material to the din user node;

wherein the delivering cost is calculated according to a sixth formula, and the sixth formula comprises:

$$C_D = \sum_{d}\sum_{j^l}\Big[cdf^{n}_{j^ld}y_{dj^{l-1}}z_{j^ld}n_{j^ld} + cdc^{q}_{j^ld}y_{dj^{l-1}}z_{j^ld}\big(m_{j^ld} - n_{j^ld}\big)\Big]$$

wherein $$cdf^{n}_{j^ld}$$

represents a delivering cost for a first order when the $j^l_{th}$ candidate warehouse provides the material to the $d_{th}$ user node, $$cdc^q_{j^l d}$$

represents a delivering cost for extra weight when the $j^l_{th}$ candidate warehouse provides the material to the $d_{th}$ user node, $m_{j^l d}$ represents total weight of the material provided by the $j^l_{th}$ candidate warehouse to the $d_{th}$ user node;

wherein the delivering time is calculated according to a seventh formula, and the seventh formula comprises:

$$T^* = \sum_{j^l}\sum_{d} T_{j^l d} z_{j^l d}$$

$T_{j^l d}$ represents a conveying time parameter when the $j^l_{th}$ candidate warehouse provides the material to the $d_{th}$ user node.

14. The server according to claim 13, wherein the inventory cost for the candidate conveying route comprises:

an inbound cost from the source node of supply to a last stage candidate warehouse in the candidate conveying route, a first outbound cost from the source node of supply to the last stage candidate warehouse in the candidate conveying route, and a second outbound cost from the last stage candidate warehouse to the user node in the candidate conveying route;

wherein the inbound cost is determined according to a total number of a material provided by the last stage candidate warehouse to the user node, a single-piece inbound cost for the source node of supply, a single-piece inbound cost for the candidate warehouse, the first route variable, the second route variable, the third route variable, and the fourth route variable;

the first outbound cost is determined according to total volume of the material provided by the last stage candidate warehouse to the user node, an outbound cost by volume for the source node of supply, an outbound cost by volume for the candidate warehouse, the first route variable, the second route variable, the third route variable, and the fifth route variable.

15. The server according to claim 14, wherein the second outbound cost comprises a basic outbound cost and an additional outbound cost;

wherein the basic outbound cost is determined according to an outbound cost for a first order of the last stage candidate warehouse, an outbound cost for a subsequent piece of the last stage candidate warehouse, a total number of the material provided by the last stage candidate warehouse to the user node, an order quantity of a user, the third route variable, and the fifth route variable; and the additional outbound cost is determined according to a single-piece outbound cost for the last stage candidate warehouse, an outbound cost by volume for the last stage candidate warehouse, the total number of the material provided by the last stage candidate warehouse to the user node, the total volume of the material provided by the last stage candidate warehouse to the user node, the third route variable, and the fifth route variable.

16. The server according to claim 13, wherein the delivering cost is determined according to an order quantity of the user, total weight of a material required by a user, a delivering cost for a first order from a last stage candidate warehouse to the user node, a delivering cost for extra weight from the last stage candidate warehouse to the user node, the third route variable, and the fifth route variable.

17. The server according to claim 13, wherein the processor is further configured to:

obtain the user node and material information in the user order information;

determine at least one target source node of supply according to the material information;

obtain at least one target conveying route between each of the at least one target source node of supply and the user node;

select a final conveying route from the at least one target conveying route; and generate the conveying instruction according to the final conveying route.

18. The server according to claim 13, wherein after receiving the conveying instruction, the conveying device analyzes the conveying instruction to obtain the target conveying route, and the conveying device conveys the material from the source node of supply to the user node according to the target conveying route.

19. A material conveying system, comprising a conveying device and a server, wherein the server comprises a memory and a processor, the memory is configured to store an instruction executable by the processor, and the processor is configured to:

determine a target conveying route from a plurality of candidate conveying routes according to a route planning model; wherein the candidate conveying routes refer to routes from a source node of supply to a user node via at least one candidate warehouse;

generate a conveying instruction according to the target conveying route and user order information; and send the conveying instruction for actively controlling a conveying device to convey a material from the source node of supply to the user node via the target conveying route, wherein the route planning model comprises an objective function and the objective function comprises a conveying cost and conveying time;

wherein the conveying cost is obtained according to a route variable set and a conveying cost parameter of a respective candidate warehouse, and the conveying time is obtained according to the route variable set and a conveying time parameter of the respective candidate warehouse;

wherein the conveying cost comprises an inventory cost for a candidate conveying route, a delivering cost for the candidate conveying route, and a transferring cost for the candidate conveying route; and wherein the route variable set comprises a first route variable, a second route variable, a third route variable, a fourth route variable, and a fifth route variable, wherein the first route variable represents whether a certain candidate warehouse is selected to transmit a material to another candidate warehouse, the second route variable represents whether a certain source node of supply provides a material to a certain candidate warehouse, the third route variable indicates whether a certain candidate warehouse provides a material to a user node, the fourth route variable indicates whether a certain source node of supply provides a material to a certain user node via at least one candidate warehouse, and the fifth route variable indicates whether to provide a material to the user node via a plurality of candidate warehouses, wherein the objective function comprises:

$$f = \min\left(w_1 \times \frac{C^*}{C_b} + w_2 \times \frac{T^*}{T_b}\right)$$

wherein f represents the objective function, min(•) represents calculating a minimum value, $w_1$ represents a cost weight, $C^*$ represents a conveying cost, $C_b$ represents a cost benchmark value, $w_2$ represents a time weight, $T^*$ represents conveying time, and $T_b$ represents a time benchmark value;

wherein the conveying cost is calculated according to a first formula, and the first formula comprises:

$$C^* = C_W + C_D + C_T$$

wherein $C_W$ represents an inventory cost, $C_D$ represents a delivering cost, and $C_T$ represents a transferring cost;

wherein the inventory cost is calculated according to a second formula, and the second formula comprises:

$$C_W = C_{W1} + C_{W2} + C_{W3}$$

$C_{W1}$ represents an inbound cost, $C_{W2}$ represents a first outbound cost, and $C_{W3}$ represents a second outbound cost;

wherein the inbound cost is calculated according to a third formula, and the third formula comprises:

$$C_{W1} = \sum_{o} \sum_{j^1 \ldots j^l} \sum_{i^1 \ldots i^l} \sum_{d} \left[ ci_o^{wh} x_{oi^1} + ci_{i^1}^{wh} y_{i^1 j^1} + ci_{j^1}^{wh} y_{j^1 i^2} + \ldots + ci_{i^l}^{wh} y_{i^l j^l} + ci_{j^l}^{wh} z_{j^l d} \right) y_{do} q_{j^l d} \Big]$$

i and j both represent an identifier of a candidate warehouse, 1≤i, j≤l, l represents a total number of the candidate warehouse, d represents an identifier of a user node, 1≤d≤m, m represents a total number of the user node, o represents an identifier of a source node of supply, 1≤o≤p, p represents a total number of the source node or supply, $$ci_o^{wh}$$

represents a single-piece inbound cost for an $o_{th}$ source node of supply, $x_{oi^1}$ is a second route variable which represents whether the $o_{th}$ source node of supply provides a material to an $i^1{}_{th}$ candidate warehouse, $$ci_{i^1}^{wh}$$

represents a single-piece inbound cost for the $i^1{}_{th}$ candidate warehouse, $$ci_{j^1}^{wh}$$

represents a single-piece inbound cost for a $j^1{}_{th}$ candidate warehouse per piece, $y_{j^1 j^1}$ is a first route variable which represents whether the $j^1{}_{th}$ candidate warehouse provides a material to the $j^1{}_{th}$ candidate warehouse, $y_{j^1 i^2}$ represents whether the $j^1{}_{th}$ candidate warehouse provides a material to an $i^2{}_{th}$ candidate warehouse, $z_{j^l d}$ is a third route variable which represents whether a $j^l{}_{th}$ candidate warehouse provides a material to a $d_{th}$ user node, $y_{do}$ is a fourth route variable which represents whether the $o_{th}$ source node of supply provide a material to the $d_{th}$ user node via a candidate warehouse, $q_{j^l d}$ represents a total number of the material provided by the $j^l{}_{th}$ candidate warehouse to the $d_{th}$ user node, $i^1$, $i^2$, . . . , $i^{l-1}$ and $i^l$ represent l values of i, $j^1$, $j^2$, . . . , $j^{l-1}$ and $j^l$ represent l values of j;

wherein the first outbound cost is calculated according to a fourth formula, and the fourth formula comprises:

$$C_{W2} = \sum_{o} \sum_{j^1 \ldots j^l} \sum_{i^1 \ldots i^l} \sum_{d} \left[ \left( co_o^{wh} x_{oi^1} + co_{i^1}^{wh} y_{i^1 j^1} + co_{j^1}^{wh} y_{j^1 i^2} + \ldots + co_{i^l}^{wh} y_{i^l j^l} + co_{j^l}^{wh} z_{j^l d} \right) y_{di^{l-1}} v_{i^{l-1} d} \right]$$

wherein $$co_o^{wh}$$

represents an outbound cost by volume for the $o_{th}$ source node of supply, $$co_{i^1}^{wh}$$

represents an outbound cost by volume for the $i^1{}_{th}$ candidate warehouse, $$co_{j^1}^{wh}$$

represents an outbound cost by volume for the $j^1{}_{th}$ candidate warehouse, $z_{j^l d}$ is the third route variable which represents whether the $j^l{}_{th}$ candidate warehouse provides a material to the $d_{th}$ user node, $y_{di^{l-1}}$ is a fifth route variable which represents whether an $i^{l-1}{}_{th}$ candidate warehouse provides a material to the $d_{th}$ user node via other candidate warehouses, $v_{i^{l-1} d}$ represents total volume of the material provided by the $i^{l-1}{}_{th}$ candidate warehouse to the $d_{th}$ user node;

wherein the second outbound cost is calculated according to a fifth formula, and the fifth formula comprises:

$$C_{W3} = \sum_{o} \sum_{j^1 \ldots j^l} \sum_{i^1 \ldots i^l} \sum_{d} \Big[ cf^n_{j^l d} y_{dj^{l-1}} z_{j^l d} n_{j^l d} + cc^q_{j^l d} y_{dj^{l-1}} z_{j^l d} \left(q_{j^l d} - n_{j^l d}\right)(1 - \rho_d) + \rho_d \left( co^v_{j^l d} y_{dj^{l-1}} z_{j^l d} v_{j^l d} + co^q_{j^l d} y_{dj^{l-1}} z_{j^l d} q_{j^l d} \right) / 2 \Big]$$

wherein $$cf^n_{j^l d}$$

represents an outbound cost for a first order when the $j^l{}_{th}$ candidate warehouse provides the material to the $d_{th}$ user node, $y_{dj^{l-1}}$ is the fifth route variable which represents whether a $j^{l-1}{}_{th}$ candidate warehouse provide a material to the $d_{th}$ user node via other candidate warehouses, $z_{j^l d}$ is the third route variable which represents whether a $j^l{}_{th}$ candidate warehouse provides a material to the $d_{th}$ user node, $n_{j^l d}$ represents an order quantity of the material provided by the $j^l{}_{th}$ candidate warehouse to the $d_{th}$ user node, $$cc^q_{j^l d}$$

represents an outbound cost for a subsequent piece when the $j^l{}_{th}$ candidate warehouse provides the material to the $d_{th}$ user node, $q_{j^l d}$ represents a total number of the material provided by the $j^l{}_{th}$ candidate warehouse to the $d_{th}$ user node, $\rho_d$ represents an adjustment coefficient, $$co^v_{j^l d}$$

represents an outbound cost by volume when the $j^l{}_{th}$ candidate warehouse provides the material to the $d_{th}$ user node, and $$co^q_{j^l d}$$

represents a single-piece outbound cost when the $j^l{}_{th}$ candidate warehouse provides the material to the $d_{th}$ user node;

wherein the delivering cost is calculated according to a sixth formula, and the sixth formula comprises:

$$C_D = \sum_{d} \sum_{j^l} \left[ cdf^n_{j^l d} y_{dj^{l-1}} z_{j^l d} n_{j^l d} + cdc^q_{j^l d} y_{dj^{l-1}} z_{j^l d} \left(m_{j^l d} - n_{j^l d}\right) \right]$$

wherein $$cdf^n_{j^l d}$$

represents a delivering cost for a first order when the $j^l{}_{th}$ candidate warehouse provides the material to the $d_{th}$ user node, $$cdc^q_{j^l d}$$

represents a delivering cost for extra weight when the $j^l{}_{th}$ candidate warehouse provides the material to the $d_{th}$ user node, $m_{j^l d}$ represents total weight of the material provided by the $j^l{}_{th}$ candidate warehouse to the $d_{th}$ user node;

wherein the delivering time is calculated according to a seventh formula, and the seventh formula comprises:

$$T^* = \sum_{j^l} \sum_{d} T_{j^l d} z_{j^l d}$$

$T_{j^l d}$ represents a conveying time parameter when the $j^l{}_{th}$ candidate warehouse provides the material to the $d_{th}$ user node.

20. The material conveying system according to claim 19, wherein the processor is further configured to:

obtain the user node and material information in the user order information;

determine at least one target source node of supply according to the material information;

obtain at least one target conveying route between each of the at least one target source node of supply and the user node;

select a final conveying route from the at least one target conveying route; and generate the conveying instruction according to the final conveying route.

* * * * *